May 3, 1938.  J. B. DICKSON ET AL  2,115,906
REFLECTOR
Filed March 23, 1935  3 Sheets-Sheet 1
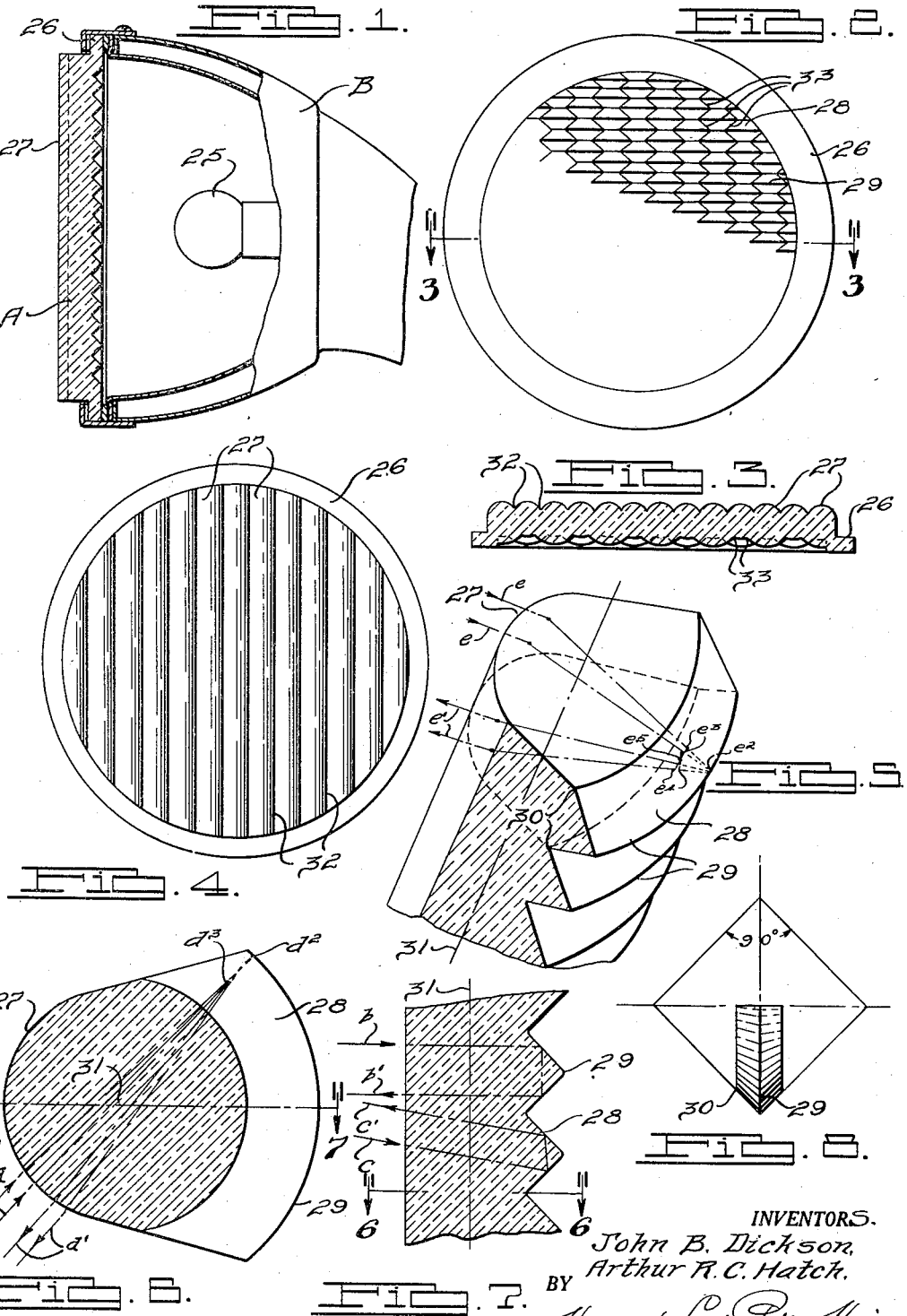
INVENTORS.
John B. Dickson,
Arthur R. C. Hatch,
BY Harness, Dind, Patee & Harris
ATTORNEYS.

May 3, 1938.  J. B. DICKSON ET AL  2,115,906
REFLECTOR
Filed March 23, 1935    3 Sheets-Sheet 2
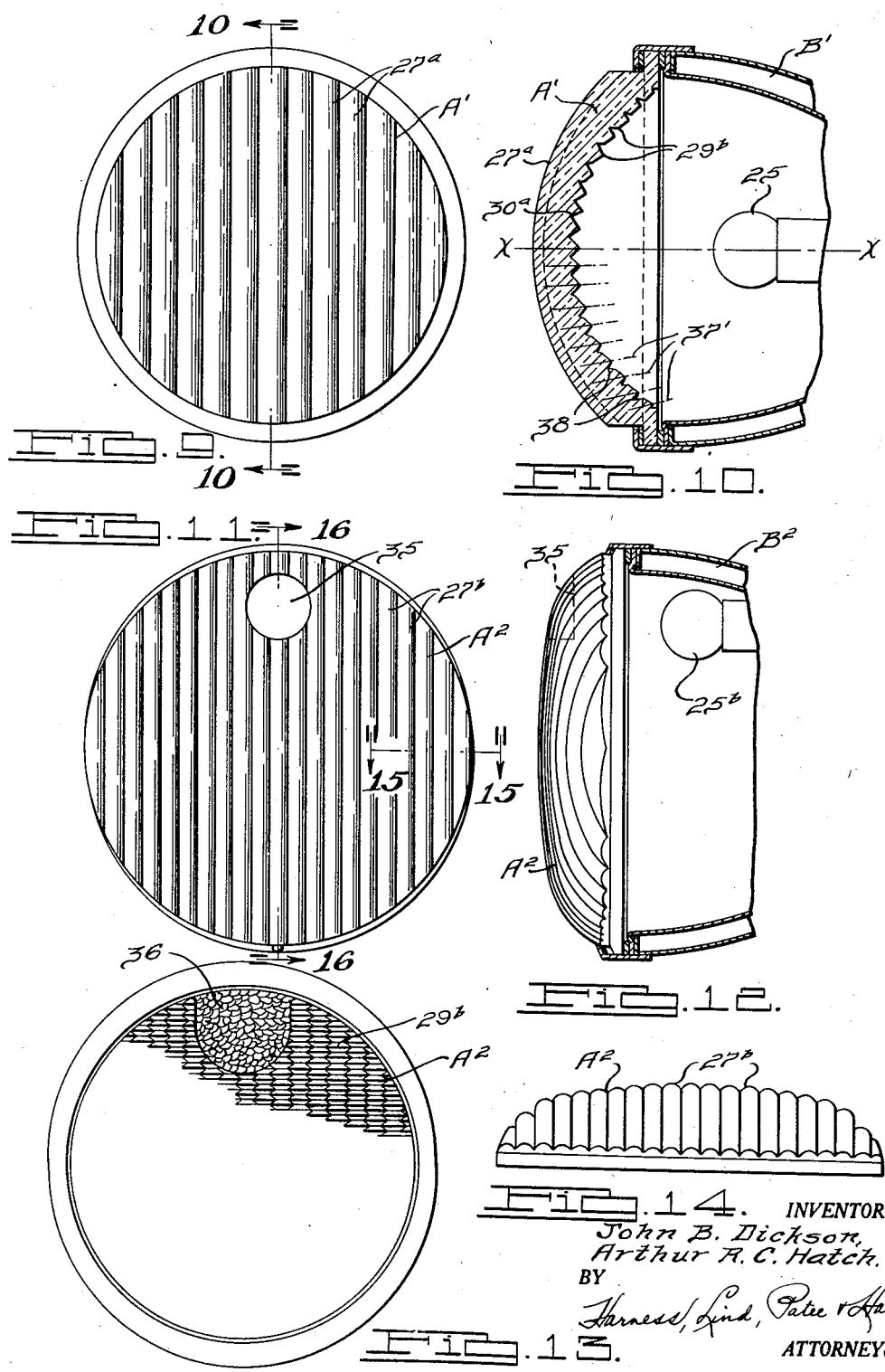
INVENTORS.
John B. Dickson,
Arthur R. C. Hatch.
BY
Harness, Dind, Patee & Harris
ATTORNEYS May 3, 1938.  J. B. DICKSON ET AL  2,115,906
REFLECTOR
Filed March 23, 1935  3 Sheets-Sheet 3
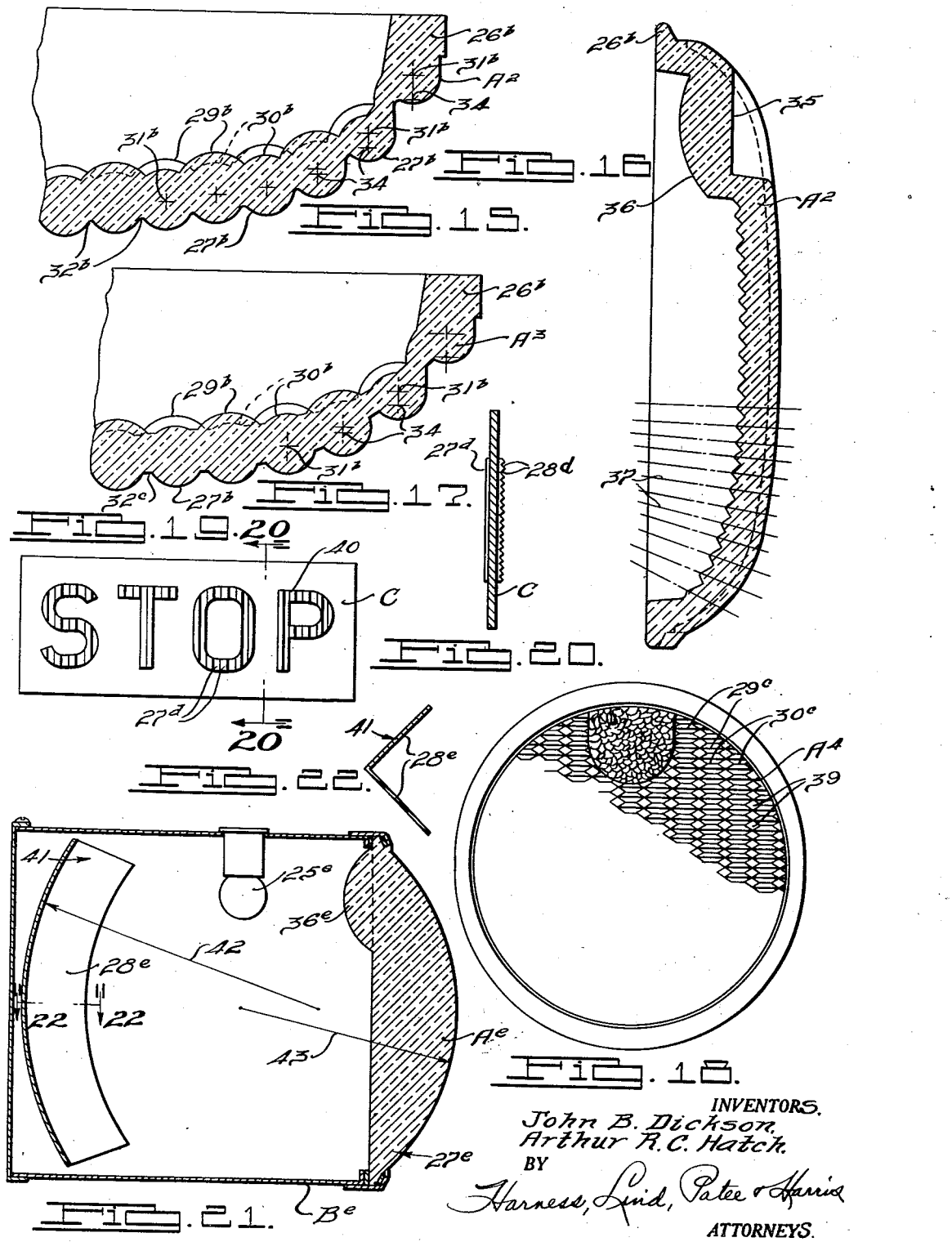
INVENTORS.
John B. Dickson.
Arthur R. C. Hatch.
BY Harness, Lind, Patee & Harris
ATTORNEYS.

Patented May 3, 1938

2,115,906

UNITED STATES PATENT OFFICE 2,115,906

REFLECTOR

John B. Dickson, Huntington Woods, and Arthur R. C. Hatch, Detroit, Mich., assignors to Chrysler Corporation, Highland Park, Mich., a corporation of Delaware Application March 23, 1935, Serial No. 12,596

10 Claims. (Cl. 88—82)

This invention relates to reflectors and the like and refers more particularly to improvements in optical devices having a wide range of uses including signs, signals, vehicle tail lights, etc.

One object of our invention is to provide a reflector having improved characteristics of light reflection capable of returning light rays with improved efficiency back approximately to the light source at greater angles and throughout a greater range of effectiveness than has been accomplished heretofore.

Another object of our invention resides in the provision of an improved reflector which may be manufactured at relatively low cost.

Other objects of our invention are to provide an improved arrangement of reflector units for the reflector body resulting in high reflecting efficiency for a given reflector area or size; to provide a reflector which may also be employed as a light transmitting medium as is desirable for use with tail light illuminated signals; and to provide an improved reflector which will lend itself to a wide variety of uses.

Further objects and advantages of our invention will be more apparent from the following illustrative description of several embodiments which our invention may assume, reference being had to the accompanying drawings, in which:

Fig. 1 is a sectional elevational view through our reflector and associated vehicle tail light or lamp.

Fig. 2 is a rear or inside elevational view of the reflector and light transmitting lens shown in Fig. 1.

Fig. 3 is a sectional view through the lens taken along line 3—3 of Fig. 2.

Fig. 4 is a front elevational view of the same lens.

Fig. 5 is an enlarged sectional perspective view of a portion of one of the reflector units, the upper part of the unit being illustrated as a phantom view.

Fig. 6 is a sectional enlarged plan view through one of the reflector units taken as indicated by line 6—6 of Fig. 7.

Fig. 7 is a fragmentary enlarged elevational view of a unit taken as indicated by line 7—7 of Fig. 6.

Fig. 8 is a diagram illustrating the general form of the reflecting surfaces.

Fig. 9 is a front elevational view of a modified form of our reflector lens.

Fig. 10 is a sectional side elevational view through the same illustrating a tail light mounting, the lens section being taken along line 10—10 of Fig. 9.

Fig. 11 is a front elevational view of a further modified form of our lens.

Fig. 12 is a side elevational view of the Fig. 11 lens illustrating a tail light mounting therefor in section.

Fig. 13 is a rear elevational view of the Fig. 11 lens.

Fig. 14 is a bottom elevational view of the Fig. 11 lens.

Fig. 15 is an enlarged sectional view along line 15—15 of Fig. 11 illustrating a portion of the lens.

Fig. 16 is an enlarged sectional elevational view along line 16—16 of Fig. 11.

Fig. 17 is a sectional view corresponding to Fig. 15 but showing a further slightly modified lens construction.

Fig. 18 is a view corresponding to Fig. 13 but illustrating a still further modified arrangement of the lens reflector units.

Fig. 19 is a front elevational view of a sign illustrating the principles of our invention.

Fig. 20 is a sectional elevational view along line 20—20 of Fig. 19.

Fig. 21 is a sectional plan view of a tail lamp embodying a further modification of our invention.

Fig. 22 is a detail sectional view of the reflector taken along line 22—22 of Fig. 21.

Referring to the drawings, reference character A represents the glass transparent lens, preferably of red color when used with a vehicle tail lamp B having the usual electric illuminator 25. The lens A has an annular flange 26 for mounting in lamp B and the outer face of the lens, which is presented toward the source of light to be reflected, is provided with a plurality of vertically extending contiguously arranged ribs or condensing surface portions 27.

The inner surface of lens A is provided with a plurality of groups of reflecting surfaces 28, vertically arranged in groups lying rearwardly behind each condensing surface 27 and constituting therewith what may be termed a reflecting unit of the lens as best illustrated in Fig. 5. These reflecting surfaces 28 are in the nature of ridges or teeth having circular segmental peaks 29 and valleys 30.

The function of the condensing surface 27 of each unit is to condense or concentrate the light rays directed toward the lens in a small area on the reflecting surfaces for reflection through a point and then a similar slight spread to the companion reflecting surface and thence back in the general direction of the light source. Most of the light rays strike surfaces 28 between the peaks 29 and valleys 30 but a small percentage of the light striking the peaks and valleys is not reflected and passes through the lens. It is not desired, for most purposes, to form the lens as an optically perfect device and in practice the lens is molded or pressed which inherently provides sufficient surface imperfections to give the desired degree of spread to the reflected light so that it is visible within a desired range about the light source.

The condensing surfaces 27 act, for a very wide range of light approach, to concentrate the light in a small zone at the reflecting surfaces so that the light is not unduly spread and dissipated out of the range of vision in the zone of the light source. By reason of the curved condensing surfaces, it is possible as a practical matter to design reflector surfaces which will properly reflect the light for various angles of light approach.

The condensing surfaces 27, if theoretically perfect, would be formed in cross-section as a segment of an ellipse with all light being concentrated at the remote focal point but as a matter of practical expediency, it is desirable to make these surfaces as segments of circular cylinders as shown in Fig. 6. This also provides a certain amount of desirable spreading of the reflected light supplementing the aforesaid spread obtained by unavoidable imperfections in the molded, pressed, or cut surfaces of the ridges when made according to usual glass manufacturing methods. It is with the foregoing in mind that I refer to the condensing surfaces as being "arcuate" in cross-section since this term is intended to include portions of arcs of circular, elliptical, or other curving formations.

The ridges or teeth forming surfaces 28 are portions of complementary right circular cones as indicated in Fig. 8, a typical pair of complementary reflecting surfaces being shown as segments of cone frustrums.

Referring to the drawings, a typical ray of light $b$ in Fig. 7 entering the lens parallel to its horizontal axis leaves the lens at $b'$ after internal reflection at surfaces 28, it being understood that our illustrations of light rays are somewhat diagrammatic in that we have not attempted to show the slight spread of the reflected rays, the exact refraction angles, and the like. However, the illustrated rays will serve to show the principles of our invention. The ray $c$ is inclined indicating a light source above that for ray $b$. The ray $c$ leaves at $c'$ after internal reflection, being returned in the general direction of the light source.

Fig. 6 illustrates the wide angle of activity possible with our reflector, the rays $d$ lying in a plane parallel to the horizontal axis of the lens and approaching the reflector at a relatively wide angle from said horizontal lens axis which lies along line 7—7 of Fig. 6. The rays $d$ illustrate the manner in which laterally spaced pencils or rays of light are converged by the condensing surface 27, the geometry of the illustrated reflector being such that such laterally spaced parallel rays are theoretically merged approximately at a point $d^2$ along peak 29. Before reaching point $d^2$ most of the rays strike a reflecting surface 28 at an area $d^3$ for rays $d$, whence the rays are reflected to the companion reflecting surface and back along $d'$ at the other side of the unit axis 31. Thus rays entering the reflector on one side of axis 31 leave the reflector on the other side thereof.

The upper part of the reflector unit illustrated in Fig. 5 is shown in phantom in order to diagrammatically illustrate reflection of laterally spaced approaching light rays $e$ which are converged theoretically to point $e^2$ but which strike one reflector surface 28 at $e^3$ for reflection to the companion reflector surface at $e^4$, the rays passing approximately through a point of intersection $e^5$ between the pair of reflector surfaces 28. From $e^4$ the rays are reflected generally back to the light source along $e^1$.

While, from a standpoint of geometrically correct optics the curved lines of the peaks 29 and valleys 30 are an approach to an ellipse having an inner axis along line 7—7 which is also the major axis of the condensing surface 27, as a practical matter we prefer to form the peaks and valleys as circular segments whose centers (as in Fig. 6) substantially coincide with the axis 31 about which the condensing surface 27 is also struck. Such arrangement is thus preferred for the flat type of reflector or lens shown in Fig. 1 although other more efficient arrangements are preferred where the whole lens surface is curved as will be hereinafter noted in greater detail.

In order to materially increase the efficiency of reflection for a given area and for a wide range of operation, we have made the width of each unit at its rear greater than the width of the unit at the condensing surface. Thus, the peaks 29 and valleys 30 lie along arcs which are long relative to the arc of condensing surface 27. When the units are arranged adjacent one another to provide a reflector body such as the lens A, we have provided a novel staggered arrangement of the reflector teeth which avoids the necessity of laterally spacing the units to avoid interference of laterally adjacent reflector teeth. Thus, in Figs. 3 and 4, the condensing surfaces 27 of adjacent reflector units may be arranged immediately adjacent each other with common vertical lines of meeting 32 while adjacent reflector teeth are vertically staggered a distance of half a tooth so that the opposite side portions of each of the peaks 29 of one unit vertically overlap corresponding peak side portions of adjacent units, such side portions projecting into the spaces provided by the valleys 30 of adjacent units. The staggered arrangement of successively adjacent units is best noted in Figs. 2 and 3.

Where the reflector is employed as a lens of a tail lamp B, light rays from the bulb 25 are transmitted rearwardly through lens A directly at the peaks 29, valleys 30, and at the zones 33 between laterally adjacent reflecting units, the refracted light striking surfaces 28 also being transmitted rearwardly in diffused condition. If desired, the lens may be provided with special light transmitting portions or areas as will hereinafter be pointed out in greater detail.

In the event that bulb 25 fails to illuminate the lens A, the light rays from an approaching vehicle will be reflected so as to be visible as a warning signal to the driver of the approaching vehicle even where the angle of approach is relatively great.

Instead of using the reflector in tail lamps, it will be obvious that many other useful applications of the reflector may be made including road signs, house number signs, and signals of various sorts.

In Figs. 9 and 10 we have illustrated our reflector as a lens A' mounted in lamp B' as before described. The lens A' is spherical primarily to provide a reduction in the amount of uncolored surface reflection and also to improve the appearance of the lens. It is generally desired in the trade to provide a curved lens for tail lamps and with such a lens problems of reflection arise which are not present in the flat type lens of Fig. 1. Such problems will be discussed in greater detail in reference to the lens shown in Figs. 11 to 15

16 wherein we have illustrated the preferred structure for commercial use. In this embodiment it will be noted that the lens A² is not flat, nor is it spherical; such lens is generally elliptically contoured both vertically and horizontally. This type of lens is highly efficient for a curved lens and is preferably formed as follows:

It will first be noted that, as best shown in Fig. 15, the lens thickness diminishes toward its annular margin 26ᵇ to compensate for the otherwise further distance of light travel through the curved border regions relative to the travel through the more central sections, assuming a normal light approach in the general region of the illustrated rays b or c of Fig. 7 over the whole surface of lens A². Where the lens is flat, as in Fig. 1, such varying distance of light travel for parallel rays at any one time over different portions of the lens does not occur.

For a curved lens we therefore prefer to gradually reduce the lens thickness from the center to the margins to compensate for this increased length of light travel through the lens due to the angularity of the glass near the margins, thereby preserving the efficiency of the entire curved lens surface.

In Fig. 15 the vertically curving axes 31ᵇ containing the centers for the laterally curved condensing surfaces 27ᵇ also contain the centers of the arcs for the peaks 29ᵇ and valleys 30ᵇ in the central regions of the lens. However, toward the border regions of the lens, the axes 31ᵇ are spaced from the axes 34 in progressively increasing amounts in the direction of the horizontal axis of the lens, the axes 34 containing the centers for the peaks 29ᵇ and valleys 30ᵇ of the reflector units associated therewith.

In Figs. 11 to 16 the condensing surfaces 27ᵇ are immediately adjacent each other presenting curved vertically intersecting lines 32ᵇ, the adjacent units having their tooth peaks and valleys vertically staggered as before noted. The bulb 25ᵇ is located near the top of lamp B² in approximate longitudinal alignment with a special zone 35 of direct light transmitting characteristics, the reflector units being interrupted to accommodate formation of zone 35. The inner surface 36 of this direct light transmitting zone may be stippled as indicated in Fig. 13 to diffuse the light passing therethrough.

As a further advantage of reducing the thickness of the curved lens near the margins, and again assuming normal conditions of a generally head-on beam approach, or light approach within the normal range of activity of the reflector, it will be apparent that horizontal sections of the condensing portions of the lens units near the borders are no longer circular segments but are more elliptical, which has the effect of shortening the focal length of the condensing surfaces. Thus, reducing the thickness of such lens portions brings the reflecting surfaces closer to the condensing surfaces to compensate for the reduction in said focal length and to thereby increase the reflecting efficiency of the lens.

The staggered arrangement permits the use of wider reflector teeth or ridges than would otherwise be possible and a wider condensing portion, thereby increasing the efficiency of a given lens or other reflector area especially for angular light approach where the extreme side portions of the reflector teeth are utilized. Furthermore, the staggered arrangement provides for a more uniform quality of reflected light over the reflector area as a whole.

The number of peaks per given area of lens or the pitch of the reflector teeth has to do with the number of peaks and valleys desired for controlling the direct light transmitting characteristics of the lens and the reflecting properties thereof. The greater the pitch, the less the number of peaks and valleys and the less will be the amount of direct unrefracted light transmission, but the reflecting properties will be thereby increased. The greater the pitch, the more will be the overlap of adjacent peaks and valleys resulting in a greater lateral angular range of reflection, because such greater pitch is accompanied by deeper flutes or valleys between adjacent condensing surfaces. If desired, the adjacent condensing surfaces may be spaced by providing vertical bands of direct light transmitting areas 32ᶜ for the lens A³ of Fig. 17, this lens being otherwise as in Fig. 15. These areas 32ᶜ may be conveniently provided by laterally spacing the adjacent reflector units of the Fig. 15 lens, by way of example, the staggering of the teeth and a certain amount of lateral tooth overlap being preserved in the Fig. 17 arrangement.

Our reflector in all of its forms except that shown in Figs. 21 and 22 depends for its reflecting action upon an optical phenomenon which is known to those skilled in the art as total reflection, and is a characteristic of all transparent material. In the case of commercial molded glass, for example, total reflection occurs when the light within the glass meets the reflecting surface at an angle of approximately 42° or more to the normal.

It will be apparent that, with the curved lenses of Figs. 10, 12, or 17, the refraction angle of normal light approach from the rear toward the border regions of the lens would tend to direct the light rays at the reflector teeth substantially at angles less than 42° to the normals of the tooth reflector surfaces, if the central tooth arrangement were carried out to the border regions. Such arrangement would result in absence or reduction of light reflection at the border regions, the light being transmitted through the lens. To compensate for such condition, we progressively incline the ridges toward the border. For practical expediency, this may be accomplished by shortening the depth of one reflecting surface of each tooth unit.

Thus in Fig. 16, it will be noted that the tooth inclination is not perpendicular to the lens curved contour at the borders but progressively slightly increases in inclination toward the borders as indicated by the lines 37 representing the bisecting planes for the reflecting surfaces of each successive tooth of the reflecting unit sectioned in Fig. 16. The varying angles of the teeth may be conveniently produced by changing the angle of the cutter when forming the mold for the lens.

Fig. 10 is a variation from the angular tooth arrangement in Fig. 16, in which the light reflecting efficiency has been improved by providing notches 38 between adjacent teeth at the border where the bisecting planes 37' for the reflecting surfaces have relatively great angles with the axis x—x, these angles progressively increasing toward the lens border. It will be seen that at the lower border the notches 38 serve to maintain the lower reflecting surface of each tooth partially intact, a similar arrangement occurring with the upper tooth surfaces at the upper portion of the border. This can be accomplished by regulating the thickness of the cutter forming the tooth shapes in the mold for the lens.

In Figs. 18 we have illustrated a modified form of lens A⁴ similar to lens A² except that the reflecting teeth are not staggered. In Fig. 18 the peaks 29ᶜ and valleys 30ᶜ of adjacent lens units are laterally aligned leaving light transmitting portions 39 between laterally adjacent valleys. However, the staggered arrangement of units is preferred as aforesaid.

In Figs. 19 and 20 we have illustrated an application of the principles of our invention to a reflector sign C which may bear letters, figures, or other legends 40. The body of the sign may be metal or may be formed of other opaque material with legend windows 40 receiving a multiplicity of adjacent reflector units having the condensing portions 27ᵈ and the reflector teeth having associated 90° reflector surfaces 28ᵈ as hereinbefore described. The sign C may, if desired, be mounted to accommodate a bulb in back of the reflector teeth for direct light transmission.

In Figs. 21 and 22 we have illustrated the principles of our invention for a lamp Bᵉ having bulb 25ᵉ for light transmission through the zone 36ᵉ of lens Aᵉ. In this modification, the air medium is employed between the condensing portion 27ᵉ and the single reflector 41. The lens Aᵉ is not spherical since it forms a unit condensing surface at right angles to reflector 41. Any section through lens Aᵉ perpendicular to the plane of the paper except at zone 36 would therefore be a rectangle of diminishing area toward the upper and lower borders of the lens. The lens border is shaped to fit the lamp Bᵉ and is usually circular.

The reflector may be a silver plated metallic body presenting the 90° reflecting surfaces 28ᵉ. With such arrangement, the geometry of the optical system may be such that the reflector tooth radius 42 overlaps the condensing surface radius 43 in a direction longitudinally of the system.

It will be understood that reference herein to "longitudinally" extending reflecting units or condensing ribs and to "transversely" or "laterally" extending reflecting teeth, or similar terms, are merely relative terms employed for convenience of reference in designating the desirable condition of having the condensing ribs run in a direction transverse to the general direction of the reflecting teeth.

We claim:

1. In a reflector device of the character described, a unitary transparent body having a series of substantially contiguous reflecting units, each of said units comprising a light condensing rib projecting from one side thereof and a series of substantially contiguous reflector teeth associated therewith in collimating relation and projecting from the other side of said body and extending transversely of said rib, all the teeth on the transparent body extending in the same direction, said body being curved in the direction of said reflector teeth, said body diminishing in its thickness adjacent a bounding portion thereof which is spaced from a central portion thereof in the direction of curvature of said body and relative to said central portion to bring the teeth and associated ribs of units adjacent said bounding portion relatively closely together whereby to render the collimating action of said series of units substantially uniform.

2. In a reflector device of the character described, a unitary transparent body having a series of substantially contiguous reflecting units, each of said units comprising a longitudinally extending condensing rib arcuate in transverse cross-section and a series of substantially contiguous reflector teeth rearwardly of said condensing rib, said teeth of each series having alternating peaks and valleys arcuately formed in a direction transverse to said longitudinally extending condensing rib, said body being curved laterally toward a boundary portion thereof in the direction of said teeth, the units lying adjacent said boundary portion having their associated condensing rib and teeth lying closer together than the rib and teeth of the units lying centrally of said body.

3. In a reflector device of the character described, a unitary transparent body having a series of substantially contiguous reflecting units, each of said units comprising a longitudinally extending condensing rib arcuate in transverse cross-section and a series of substantially contiguous reflector teeth rearwardly of said condensing rib, said teeth of each series having alternating peaks and valleys arcuately formed in a direction transverse to said longitudinally extending condensing rib, said body being curved laterally toward a boundary portion thereof in the direction of said teeth, the units lying adjacent said boundary portion having their associated condensing rib and teeth lying progressively closer together for those units progressively nearer said boundary portion than the corresponding spacing of the associated rib and teeth for those units lying substantially centrally of said body.

4. In a reflector device of the character described, a unitary transparent body having its front light-receiving face formed with a substantially vertically extending condensing rib presenting a convexly cylindrical front surface, said body having its rear face formed with a substantially vertically extending series of double reflector teeth, each double reflector having its two reflecting surfaces disposed substantially at right angles to one another, said teeth curving convexly in collimating relation to said rib about centers respectively lying along a substantially vertical axis within said body, said body curving rearwardly toward one of its vertical end portions, planes bisecting the angle between the surfaces of those double reflectors which are disposed adjacent said end portion and relatively remotely from the region of the reflector body axis, extending rearwardly to intersect at progressively increasing acute angles with corresponding planes for those double reflectors which are disposed at said axis region, the bisecting planes for said remotely disposed double reflectors intersecting the reflector axis at angles respectively smaller than angles between the reflector axis and planes normal to the front face of the reflector at points substantially coincident with said bisecting planes, said body progressively decreasing in its thickness normal to said body curvature toward said end portion to render the collimating action of said body end portion more uniform with respect to the collimating action of the body at said axis region.

5. In a reflector device of the character described, a unitary transparent body having its front light-receiving face formed with a substantially vertically extending condensing rib presenting a convexly cylindrical front surface, said body having its rear face formed with a substantially vertically extending series of double reflector teeth, each double reflector having its two reflecting surfaces disposed substantially at right angles to one another, said teeth curving convexly in collimating relation to said rib about centers respectively lying along a substantially vertical axis within said body, said body curving rearwardly toward one of its vertical end portions, planes bisecting the angle between the surfaces of those double reflectors which are disposed at said end portion extending rearwardly to intersect at acute angles with corresponding planes for those double reflectors which are disposed at the axis of the reflector body, the bisecting planes for the double reflectors disposed at said end portion intersecting the reflector axis at angles respectively smaller than angles between the reflector axis and planes normal to the front face of the reflector at points substantially coincident with said bisecting planes, adjacent teeth which are disposed at said end portion being notched to increase the depth of one of the reflector surfaces thereof, one wall of each notch constituting a continuation of the adjacent surface of one of the teeth at said end portion.

6. In a reflector device of the character described, a unitary transparent body having its front light-receiving face formed with a light condensing surface, said body being curved rearwardly from its axis toward a boundary portion, said body having its rear face formed with a plurality of internally reflecting units disposed in collimating relationship with said condensing surface, said body diminishing in thickness from said axis to said boundary portion to bring the units adjacent said boundary portion relatively closely to said condensing surface for rendering the collimating action of said body substantially uniform.

7. In a reflector device of the character described, a unitary transparent body curved longitudinally and having a longitudinally extending light condensing rib arcuate in transverse cross-section projecting from the outer side thereof and curving longitudinally, said body having a series of reflector teeth in collimating relation with said rib and projecting from the inner side of said body and extending transversely of said rib, the teeth of said series comprising a plurality of curved double reflectors, each double reflector having its two reflecting surfaces substantially at right angles to one another, planes respectively bisecting the angle between the surfaces of the double reflectors which are disposed adjacent the ends of said rib being inclined inwardly from said body and toward an axis of said body which lies transversely of said rib through the approximate mid-point of the longitudinal length thereof, the bisecting planes for the double reflectors disposed adjacent the ends of said rib intersecting said axis at angles respectively smaller than angles between said axis and planes normal to the outer face of said curving rib at points substantially coincident with said bisecting planes, the inclination of said bisecting planes being such that the reflecting properties of said body adjacent the ends of said rib are enhanced for light approaching the outer side of said body substantially parallel to said axis.

8. In a reflector device of the character described, a unitary transparent body curved longitudinally and having a longitudinally extending light condensing rib arcuate in transverse cross-section projecting from the outer side thereof and curving longitudinally, said body having a series of reflector teeth in collimating relation with said rib and projecting from the inner side of said body and extending transversely of said rib, the teeth of said series comprising a plurality of curved double reflectors, each double reflector having its two reflecting surfaces substantially at right angles to one another, planes respectively bisecting the angle between the surfaces of the double reflectors which are disposed adjacent one end of said rib being inclined inwardly of said body toward an axis of normal light approach to the outer side of said body, the inclination of said planes being less than that of planes respectively passing through the intersection of the surfaces of the last said double reflectors and normal to the rib curvature.

9. In a reflector device of the character described, a unitary transparent body curved in a transverse direction and having a series of substantially contiguous reflecting units, each of said units comprising a longitudinally extending condensing rib arcuate in transverse cross section and a series of substantially contiguous reflector teeth rearwardly of said condensing rib, said teeth of each series having alternating peaks and valleys arcuately formed in a direction transverse to said longitudinally extending condensing rib, each of said units having a pair of longitudinally extending axes lying within said body and respectively defining the locus of the centers of arcs forming the arcuate condensing rib thereof and the locus of the centers of arcs forming the arcuate tooth peaks and valleys thereof, said axes being substantially coincident for units located centrally of said body and being separated from each other in the direction of the axis of normal light approach to said body for units located adjacent border portions of said body, the axes of the ribs for said border units being respectively spaced rearwardly from the other of said longitudinally extending axes, the arcs defining the condensing ribs of all of said units having substantially the same radius of curvature, and the arcs forming the tooth peaks and valleys of all of said units having substantially the same radius of curvature.

10. In a reflector device of the character described, a unitary transparent body curved in a transverse direction and having a series of substantially contiguous reflecting units, each of said units comprising a longitudinally extending condensing rib arcuate in transverse cross section and a series of substantially contiguous reflector teeth rearwardly of said condensing rib, said teeth of each series having alternating peaks and valleys arcuately formed in a direction transverse to said longitudinally extending condensing rib, each of said units having a pair of longitudinally extending axes lying within said body and respectively defining the locus of the centers of arcs forming the arcuate condensing rib thereof and the locus of the centers of arcs forming the arcuate tooth peaks and valleys thereof, said axes being relatively separated by progressively greater distances in the direction of the axis of normal light approach to said body for those units located progressively nearer a border portion of said body, the axes of the ribs being respectively spaced rearwardly from the other of said longitudinally extending axes, the arcs defining the condensing ribs of all of said units having substantially the same radius of curvature, and the arcs forming the tooth peaks and valleys of all of said units having substantially the same radius of curvature.

JOHN B. DICKSON.
ARTHUR R. C. HATCH.